United States Patent [19]

Nelson et al.

[11] 3,815,234
[45] June 11, 1974

[54] CUTTER HEADS FOR LAWN TRIMMERS AND EDGERS AND WOODCARVING TOOLS

[76] Inventors: Theodore C. Nelson, Joan Dr. N., Salem, Oreg. 97303; Arthur Truman Cummings, 872 Cummings Ln. N., Salem, Oreg. 97303

[22] Filed: Jan. 10, 1973

[21] Appl. No.: 322,307

[52] U.S. Cl.................... 30/347, 30/276, 56/295
[51] Int. Cl.................................. A01d 35/26
[58] Field of Search ............ 56/17.5, 255, 256, 294, 56/295; 30/276, 347, 264

[56] References Cited
UNITED STATES PATENTS

| | | | |
|---|---|---|---|
| 2,571,455 | 10/1951 | Keiper | 30/276 X |
| 2,850,862 | 9/1958 | Asbury | 56/295 |
| 2,877,619 | 3/1959 | Benson | 56/295 |
| 3,102,376 | 9/1963 | Henderson | 56/294 |

*Primary Examiner*—Al Lawrence Smith
*Assistant Examiner*—J. C. Peters
*Attorney, Agent, or Firm*—Lee R. Schermerhorn

[57] ABSTRACT

A pair of L-shaped blades is mounted on blind pivot pins in a high speed cutter head allowing the blades to swing out by centrifugal force and pivot back into the body of the head when an obstruction is encountered. Hubs on the blades are confined in recesses in the cutter head body to prevent release of a blade if a pivot pin should break. The sharpened outer end portion of each blade is angled forward in the direction of rotation to gather in material to be cut and apply a slicing action in shearing the material. The end portions of the blades may assume different shapes for various purposes as for lawn trimming and edging and for woodcarving.

11 Claims, 8 Drawing Figures

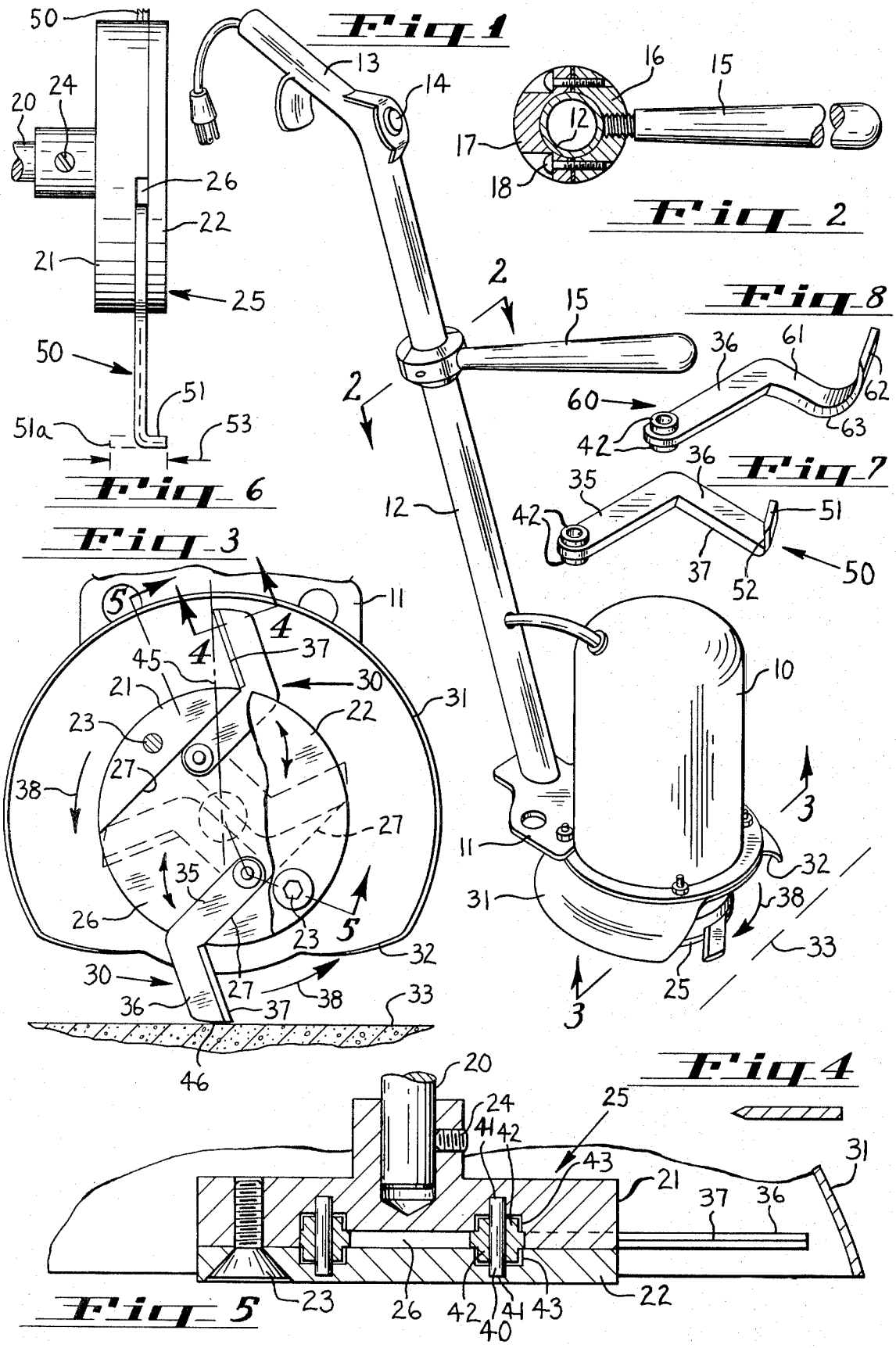

3,815,234

CUTTER HEADS FOR LAWN TRIMMERS AND EDGERS AND WOODCARVING TOOLS

This invention relates to improvements in rotary cutter heads for various purposes, such as lawn trimmers and edgers and woodcarving tools.

It has heretofore been proposed to provide retractable blades on the rotary cutter heads of lawnmowers and edgers so that upon encountering a solid obstruction a blade may be deflected backward counter to the direction of rotation. This offers some protection against breakage of the blades and against injury to the operator from flying fragments of broken blades. However, there is also the further danger of breakage of a pivot pin on which a blade is mounted, releasing the whole blade for discharge by centrifugal force as a dangerous missile.

Also, it is conventional practice to extend the cutting edges of the blades in a radial direction or at a regressive angle relative to the direction of rotation. This tends to push material away from the cutter head, impairing the cutting action.

Objects of the invention are, therefore, to provide an improved cutter head for various purposes, such as lawn trimmers and edgers and woodcarving tools, to provide a tool of the type described which is less dangerous than conventional tools, to provide a pivotally mounted blade which will not be released from its cutter head by centrifugal force if its pivot pin should break, and to provide an improved shape of blades having more efficient cutting action.

SUMMARY OF THE INVENTION

In the present construction, each blade has integral hub bosses which are confined in recesses in the cutter head to prevent release of the blade by centrifugal force if its pivot pin should break. The sharpened end portions of the blade incline forwardly in the direction of rotation to gather in material to be cut rather than pushing the material aside.

The blades are made in different shapes for different purposes. In a lawn trimmer the blades are flat. In an edger the tip ends are bent at right angles in opposite axial directions. In a woodcarving tool the blades are curved in one axial direction.

The invention will be better understood and the foregoing and other objects and advantages will become apparent from the following description of the preferred embodiments illustrated on the accompanying drawing. Various changes may be made, however, in the details of construction and arrangement of parts and certain features may be used without others. All such modifications within the scope of the appended claims are included in the invention.

BRIEF DESCRIPTION OF THE DRAWING

FIG. 1 is a perspective view of a lawn trimmer embodying the invention;
FIG. 2 is a view on the line 2—2 in FIG. 1;
FIG. 3 is a view on the line 3—3 in FIG. 1;
FIG. 4 is a view on the line 4—4 in FIG. 3;
FIG. 5 is a view on the line 5—5 in FIG. 3;
FIG. 6 is a side elevation view of an edger embodying the invention;
FIG. 7 is a perspective view of an edger blade; and
FIG. 8 is a perspective view of a blade in a woodcarving tool.

DESCRIPTION OF THE PREFERRED EMBODIMENTS

In FIG. 1 the invention is embodied in a lawn trimmer for use in marginal areas where a lawnmower cannot operate, such as along walks, driveways, walls, fences, trees and the margins of planted areas. A high speed electric motor 10 is mounted on a vertical axis in a base frame 11 having an inclined upright handle 12.

Handle 12 has a fixed handgrip 13 at its upper end with a push button motor switch 14, and an adjustable handgrip 15. Handgrip 15 is mounted as a setscrew in one part 16 of a split collar having the two complementary parts 16 and 17 which are secured together by means of screws 18. By rotating the handgrip 15 out of clamping engagement with handle 12, the handgrip may be moved up or down or rotated on handle 12 to the most convenient position for the work at hand.

Secured on the lower end of motor shaft 20 is a cutter head having two circular plates 21 and 22. Plate 22 is secured to plate 21 by a pair of screws 23 and plate 21 has a hub which is secured to shaft 20 by a setscrew 24. The cutter head in its entirety is designated by numeral 25.

The bottom side of plate 21 which confronts plate 22 is recessed at 26 between a pair of opposed vertical abutment walls 27, as shown in FIG. 3. The opposite sides of recess 26 form a pair of peripheral slots in the cutter head out of which extend a pair of cutter blades 30. Surrounding the cutter head and blades 30 is a circular guard shield 31 mounted on the housing of motor 10 and on base frame 11. One side of shield 31 is cut away at 32 to permit trimming adjacent to an obstruction, such as the wall 33, and to admit tall stems and stalks which are to be cut off.

Each cutter blade 30 is of L-shape having a flat shank end 35 within the recess 26 and a flat external end portion 36 in angular relation to the portion 35. External portion 36 has a sharpened leading edge 37, the direction of rotation of the head 25 being indicated by arrows 38.

The inner end of each blade 30 is pivotally mounted on a vertical pivot pin 40, the ends of which are mounted in cylindrical bores 41 in the plates 21 and 22. Each blade 30 also has integral hub bosses 42 concentric with pin 40 and loosely confined in a pair of cylindrical recesses 43 in the plates 21 and 22. Hub bosses 42 provide a long bearing on the pin 40 and do not normally engage the walls of recesses 43. However, if pin 40 should break, the hub bosses 42 securely retain the blade in the cutter head so that the blade cannot be dangerously released and discharged by centrifugal force.

In normal operation the blades 30 are extended from the cutter head 25 by centrifugal force as shown in solid lines in FIG. 3. The sharpened cutting edges 37 are inclined forwardly relative to the direction of rotation so as to tend to gather in the upstanding grass or stems to be cut. This forward inclination is apparent with reference to radial line 45 through the axis of rotation of shaft 20 in FIG. 3. This improves the cutting action because there is no tendency for the blades to push upstanding material aside without cutting it. Centrifugal force normally holds inner shank portion 35 of each blade against its adjacent abutment wall or shoulder 27, as shown.

Each blade has an end surface 46 which protrudes radially sufficiently to protect the sharpened edges 37 in approaching an obstruction. In FIG. 3, for example, as the trimmer is brought up to wall 33, the wall makes contact with end surface 46 rather than the sharpened edge portion 37. When this occurs, the blades retract to their broken line positions in FIG. 3, causing the back edges of the blades to strike the remote or opposite abutment walls 27 in the cutter head.

Plate 21 is preferably made of aluminum which provides a shock absorber or bumper action when the retracting blade impinges against wall 27 thereby cushioning the blow of the hard steel blade. When an obstruction is encountered in the manner described, the blades retract momentarily substantially entirely within the recess 26, giving the operator an opportunity to back away from the obstruction without damaging the tool. In order to make the tool as light weight as possible, the lower rotor head plate 22 is also preferably made of aluminum.

For use as an edger, the tool may be mounted on wheels (not shown) to support the motor and cutter head on a horizontal axis as shown in FIG. 6. Edger blades 50 are the same as trimmer blades 30 except that the outer ends 51 are turned at right angles and provided with sharpened edges 52 which form continuations of the sharpened edges 37, as shown in FIG. 7.

The ends 51 on the two blades are turned in opposite axial directions and the cutter head is traversed in a vertical radial plane to cut a groove or trench having a width as indicated by the dimensions 53. One blade is shown in solid lines in FIG. 6 and the other blade is represented by phantom lines at 51a in corresponding position. The outer portion 36 of each blade is of sufficient length in this embodiment to allow end portion 51 to remain outside of the cutter head when an obstruction is encountered, retracting the back edge of the blade into contact with abutment wall 27.

FIG. 8 shows a blade shape used for woodcarving. In this embodiment the inner shank portion 36 is lengthened so that substantially the entire angular outer end portion 61 remains outside of recess 26 even when the blade is retracted. End portion 61 is angled forward in the direction of rotation and curved upward out of the radial plane to an end 62 which is substantially perpendicular to the radial plane of rotation of the cutter head. The entire length of outer part 61 is sharpened at 63 and the end 62 is relieved behind the cutting edge for clearance in cutting in wood. In this embodiment the end portions 61, 62 of both blades are bent in the same axial direction.

Having now described our invention and in what manner the same may be used, what we claim as new and desire to protect by Letters Patent is:

1. In a rotary cutter head, a pair of pivot pins mounted parallel with the axis of rotation on opposite sides of said axis, a pair of centrifugally extendable blades having shank portions pivotally mounted on said pivot pins, hub bosses on said blades surrounding said pivot pins, and recesses in said cutter head confining said hub bosses so that said blades will not be released from said cutter head in the event of failure of said pivot pins.

2. A cutter head as defined in claim 1 comprising a pair of plates secured together in face to face relation, said recesses being formed in the mated faces of said plates, and bores in said recesses receiving the ends of said pivot pins.

3. A cutter head as defined in claim 2 including a recess in the mated face of one of said plates receiving said blades.

4. A cutter head as defined in claim 3 including side walls in said last recess forming abutments to limit the pivotal retraction of said blades into said recess.

5. A cutter head as defined in claim 1, said blades being of approximately L-shape each with a sharpened outer end portion angled forward from said shank portion in the direction of rotation of the cutter head.

6. A cutter head as defined in claim 5, said sharpened outer end portions of said blades each having a tip end portion bent in an axial direction.

7. A cutter head as defined in claim 6, the tip end portions of the two blades being bent in opposite axial directions.

8. A cutter head as defined in claim 6, the tip end portions of the two blades being bent in the same axial direction.

9. A rotary cutter head comprising a pair of mating plates secured together in face to face relation, a drive shaft hub on one of said plates for rotating the cutter head, a blade recess in the mated face of one of said plates extending on opposite sides of said hub, a pair of pivot pins in said recess parallel with said hub on opposite sides thereof, a pair of centrifugally extendable blades in said recess having inner ends mounted on said pivot pins, substantially the whole length of each blade being retractable into said recess between said plates when the blade encounters an obstruction in operation, and each blade having a sharpened outer end portion angled forward from said inner end in the direction of rotation of the cutter head.

10. A cutter head as defined in claim 9, said sharpened outer end portions of said blades each having a tip end portion bent in an axial direction.

11. A cutter head as defined in claim 9, said blades being flat and each having an end surface protruding radially slightly beyond said sharpened portion to guard said sharpened portion and retract the blade when an obstruction is encountered.

* * * * *